Figure 1:
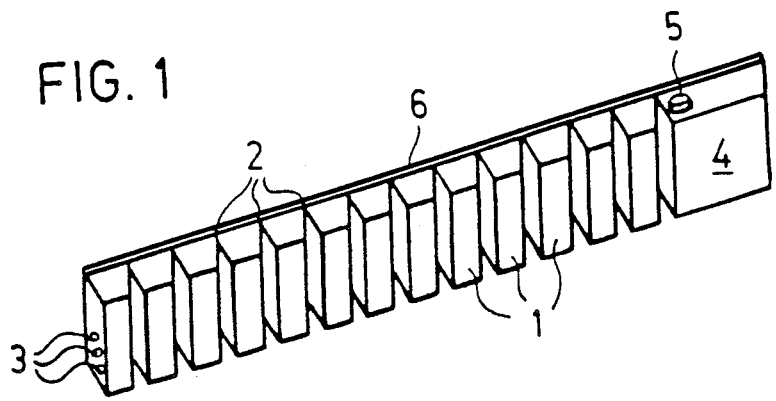

United States Patent [19]

Block

[11] Patent Number: 4,895,254

[45] Date of Patent: * Jan. 23, 1990

[54] TANK-PLANT VESSEL-COMBINATION WITH WATER-LEVEL INDICATOR AS DEVICE FOR LONG TERM WATER SUPPLY FOR VARIOUS TYPES OF PLANT CULTURES

[76] Inventor: Hubert K. Block, Othestrasse 67, D-5275 Bergneustadt, Fed. Rep. of Germany

[*] Notice: The portion of the term of this patent subsequent to Sep. 23, 2005 has been disclaimed.

[21] Appl. No.: 877,771

[22] Filed: Jun. 24, 1986

[51] Int. Cl.⁴ .............................................. B65D 85/52
[52] U.S. Cl. ...................................... 206/423; 47/80; 220/85 S; 220/403
[58] Field of Search ....................................... 47/79–82, 47/40.5, 48.5; 206/423, 514; 220/403, 855; 239/37, 39

[56] References Cited

U.S. PATENT DOCUMENTS

| | | | |
|---|---|---|---|
| 3,534,498 | 10/1970 | Herrli | 47/81 |
| 4,171,593 | 10/1979 | Bigglestone | 47/80 |
| 4,212,134 | 7/1980 | Brokamp | 47/82 |
| 4,663,884 | 5/1987 | Zeischegg et al. | 47/79 |

FOREIGN PATENT DOCUMENTS

| | | | |
|---|---|---|---|
| 0322809 | 7/1920 | Fed. Rep. of Germany | 47/79 |
| 2904187 | 8/1980 | Fed. Rep. of Germany | 47/80 |
| 3131282 | 2/1983 | Fed. Rep. of Germany | 47/79 |
| 2405009 | 6/1979 | France | 47/79 |
| 1106222 | 3/1968 | United Kingdom | 47/79 |
| 1374647 | 11/1974 | United Kingdom | 47/81 |

Primary Examiner—Jimmy G. Foster
Attorney, Agent, or Firm—Thomas W. Speckman; Douglas H. Pauley

[57] ABSTRACT

This invention pertains to a device for long-term supply for earth and hydrocultures. Conventionally, an especially designed sub-atmospheric pressure tank is manufactured for each plant vessel—as small or large container—that has proven to be expensive. The main problem of these water supply tanks are either an unfavorable use and arrangement of space (revolving tank), or their refill possibilities conceal under some circumstances the danger of tank leakiness. And necessary water-level indicators are lacking entirely. The industry offers no optimal planting vessels for the long-term watering of earth culture flowers, including bonsais. The invented device solves these problems through a tank, functioning according to the principle of sub-atmospheric pressure, which consists of at least two dimensionally stable partial tanks or tank parts, that are relatively movable against each other connected to each other. The thus alterable tank can be adjusted to, respectively fitted—in a space-saving way—into various sizes and the most sundry plant vessels as well as in small and large vessels. Flexible, traverseable parts solve the problem of refilling reliably and uncomplicatedly. Staggered floats of the water-level indicator in the short, airtight, transparent pipe permit the water-level to be read easily. Highly capilated, double-shaft clay plant pots, glazed on the outside—that stand in separating vessels—settle the problems of root ventilation and earth culture watering. A supplement of calcium sulphate- activated carbon compound granules provide for water with an excellent nutriment content and oxygenated water for longer periods of time.

17 Claims, 12 Drawing Sheets

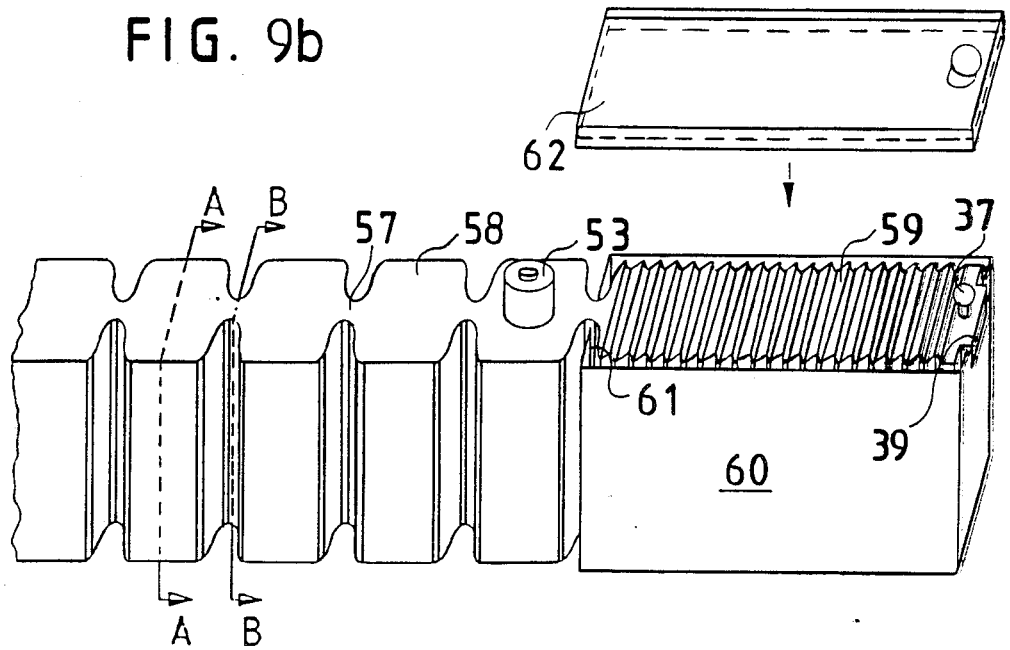
FIG. 9a
FIG. 9b
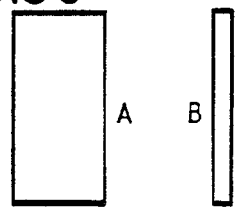
FIG. 9c
FIG. 9d
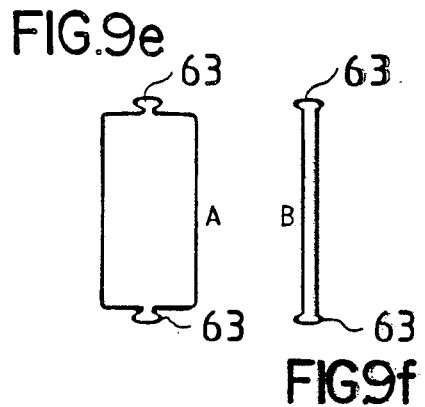
FIG. 9e
FIG. 9f
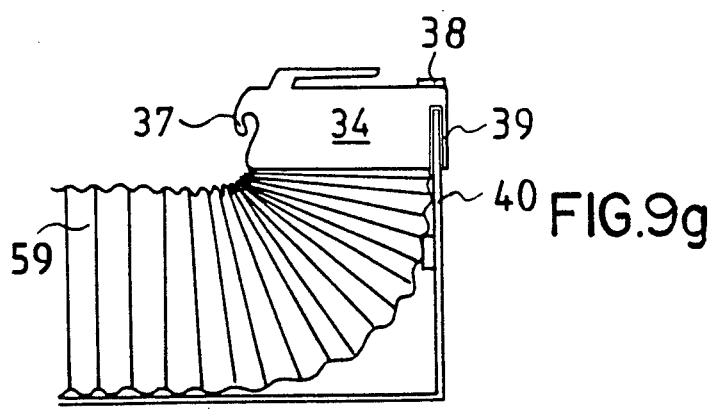
FIG. 9g FIG. 16a
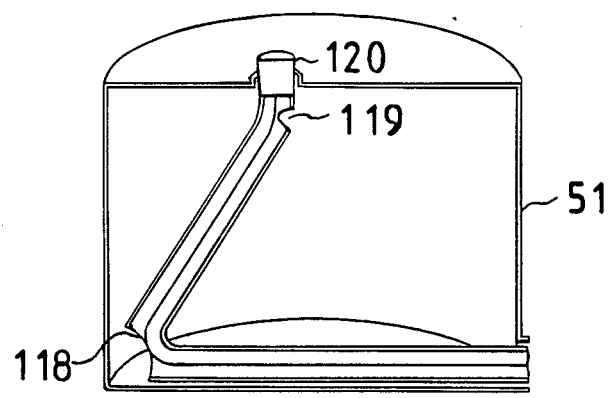
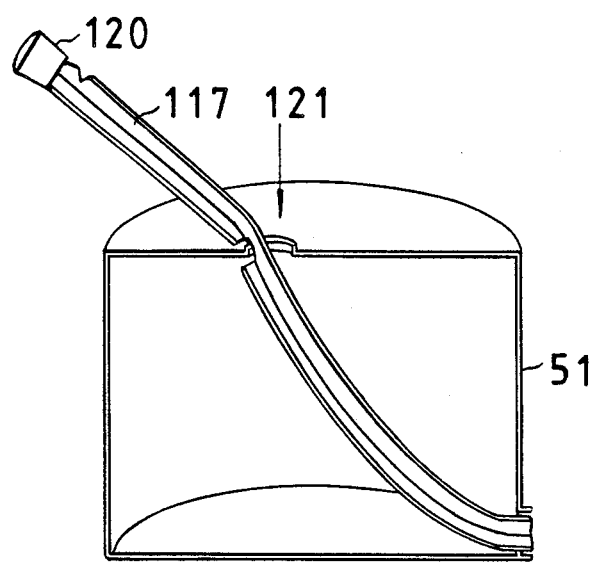
FIG. 16b

TANK-PLANT VESSEL-COMBINATION WITH WATER-LEVEL INDICATOR AS DEVICE FOR LONG TERM WATER SUPPLY FOR VARIOUS TYPES OF PLANT CULTURES

This invention pertains above all to a tank, a plant-vessel and a water-level indicator, along with a fertilizer-activated carbon supplement, as combined device for long-term watering of various plant cultures, such as hydrocultures, earth cultures, bonsai cultures and heterocultures, that partly stand in vessels for use indoors and outdoors. Even hydrocultures need a steady, more or less constant water-level in the vessel, in which they are embedded. Regarding smaller plant vessels, this is achieved through the immersion of a water-level indicator in the water of the vessel, which at any given time permits the water-level to be read. On the water-level indicator, a maximum and a minimum water-level is indicated by a marker, between which the water-level in the plant vessel is to move, in order to guarantee the prosperous growth of the plants. Due to the relatively short distance between the minimal and the maximal admissible water-level, such plant vessels have to be controlled assiduously, in order to guarantee, that the water-level moves within the approved range. If the refilling is forgotten or if water is refilled beyond the allowable water-level, the plants are in danger of becoming damaged or even of dying. In order to maintain the water-level nearly constant automatically and, at the same time, to prolong the intervals between refillings, such plant vessels are equipped with water-tanks. These water-tanks consist of hollow bodies with a water-outlet near the bottom. To put into practice, these water-tanks are placed next to the root-system of the plants in the plant vessel. Since they are hermetically sealled on top, water runs out through the water outlet only as long as air from the outside enters the tank through the outlet. This is the case, when the water-level in the plant vessel reaches the upper limiting rim of the water outlet. Above the water-surface in the tank, a sub-atmospheric pressure forms in comparison with the atmospheric pressure outside the tank, for which reason these tanks are designated as working according to the principles of the sub-atmospheric pressure. If the plant uses up water from the plant vessel through assimilation, the water-level there sinks until between it and the upper limiting rim of the water outlet of the water tank, air can enter the tank. this air increases the atmospheric pressure in the tank, whereupon water flows from the water outlet, until the pressures of the liquids in the area of the water outlet are again the same inside and outside the tank. As practical as such a sub-atmospheric pressure tank at first sight may appear, in practice, many problems arise in operating and producing it.

The faultless functioning of the principle of sub-atmospheric pressure requires a hollow body that is hermetically sealed on top. Since the tank must also be refillable, this requirement is not so easy to fulfil. For example, the stoppers used to shut the filler-hole fixed on top of the vessel, can in the course of time become leaky due to atmospheric effects such as exposure to solar radiation and changes in temperature and humidity. If screw-caps or clamps are used for shutting, they involve the risk of faulty manipulations. Even if only a little air enters a tank unnoticed, the plants, that are often quite expensive, can be destroyed by the increased water-level in the plant vessel. Conventional tanks are equipped with such a tightly closable filler-hole. The filling is to be done quickly, in order to keep the escape of water through the relatively small water outlet at a minimum. The difficulty of refilling presents one complex of problems, to which this invention suggests solutions.

A further problem is represented by the production costs of the tanks. Since the most sundry of plant vessels are offered, tanks of many different holding capacities have to be produced, in order to guarantee for each plant vessel an optimal water-supply over longer periods of time. This fact leads to considerable expenses, since for each tank size special production tools have to be procured. A further important objective of the invention therefore consists in creating a water tank, that is useable for several sizes of plant vessels and thus saves expenses.

Although the known sub-atmospheric pressure tanks do enable more prolonged watering intervals and make it possible to regulate the water-level in a plant vessel within a desired range, they leave the user in the dark though, as to when a refilling is necessary. Since a water-level indicator has been lacking till now, the user is continually more or less uncertain, as to how much water is still at disposal in the tank. If the same person always takes care of refilling a tank, this person will know from experience, more or less how long it will take, before a refilling becomes necessary. The fact though, that this cannot be ascertained at a glance, forces the user in cases of doubt, to check by opening the filler cap and make a careful visual control. The opening and closing of the filler-hole in this connection holds the additional risk of a faulty manipulation, as was mentioned above. If the filler-hole is not perfectly closed, this has under certain circumstances devastating consequences for the plant. Especially in the case of sub-atmospheric pressure tanks being used in administrations, companies and households, where various persons take turns at caring for the plants, the lack of a water-level indicator is an obvious deficiency.

The last and most difficult complex of problems arises from the long-term water-supply for both earth culture flowers and hydroculture plants. On the one hand earth culture plants are to be watered in respective small and large containers, without ranking below the hydroculture plants. On the other hand for example blooming earth culture flowers are to be put into large containers together with hydro-green plants quickly and smoothly and be well-provided with water for long periods.

Here again is a prize-question. In certain regions hydro-culture plants cost over 60% more than comparable earth culture plants. It may sometimes be proper to pay a little more for a special long-term water-providing earth culture plant pot (if such a pot exists) if much money can be saved on the expensive plant.

The problem of watering earth cultures includes the factors, (a) that their roots ought to be neither too wet nor too dry for too long a time;

(b) that the root ventilation (carbon dioxide exchange) is to be ensured permanently;

(c) that the root carbon dioxide exchange of bonsai-plants is to be ensured, too, especially since the bonsai-vessels have no central bottom hole;

(d) that no root or earth secretions from earth culture flowers are allowed to infiltrate large hydro containers;

(e) that the water is not permitted to flush the earth soaking wet all through, because this would ensue, that the earth hardens easily;

(f) that between the earth of the root-system and the water at the bottom is to be no short/direct line of communication —in the range of the plant pot —for earth vermin.

(g) that the water reserve (also in the tank) is kept free of bacteria and microbes as well as oxigenated.

This invention solves these problems by creating a water tank for long-term watering of all cultures, consisting of a hermetically sealed container, which is adjustable in a plant vessel, with a filler-hole and an outlet close to or in the bottom of the container, and which thus automatically regulates the water-level in the plant vessel according to the principle of sub-atmospheric pressure, distinguished by at least two shape-retaining reservoir parts of the container or by at least two dimensionally stable communicating partial tanks relatively movable against each other connected to each other, and through this the container in its entirety is changeable in form. The water tank in accordance with the invention is equipped with a water-level indicator that is distinguished by at least one transparent hollow body, closed at the top and projecting upwards, with one or more floating elements.

A capillary plant vessel is intended for earth cultures, with supplementry shaft and double compartment vessel, which parts are put into each other.

An activated carbon-calcium sulphate-ion exchanger-compound provides, that the water for the plants contains nutriments and is kept free from lime and microbes and oxygenated.

Figure 2:
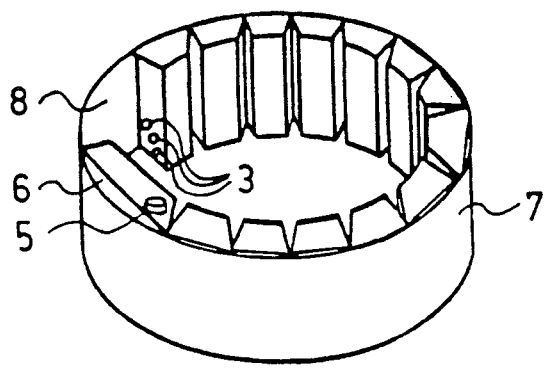

The diagrams present some examples of application of the tank-plant vessel-combination including a water-level indicator as special device for long-term water-supply for various types of plant cultures. Shown are:

FIG. 1 an articulated tank,

FIG. 2 an articulated tank put in a round plant vessel

Figure 3:
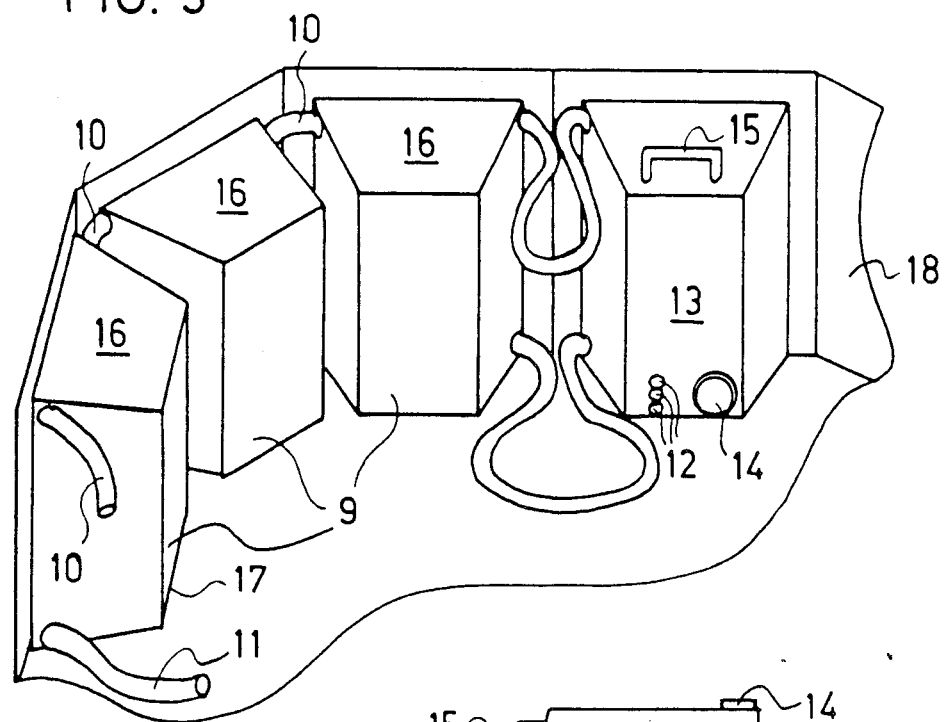
Figure 4:
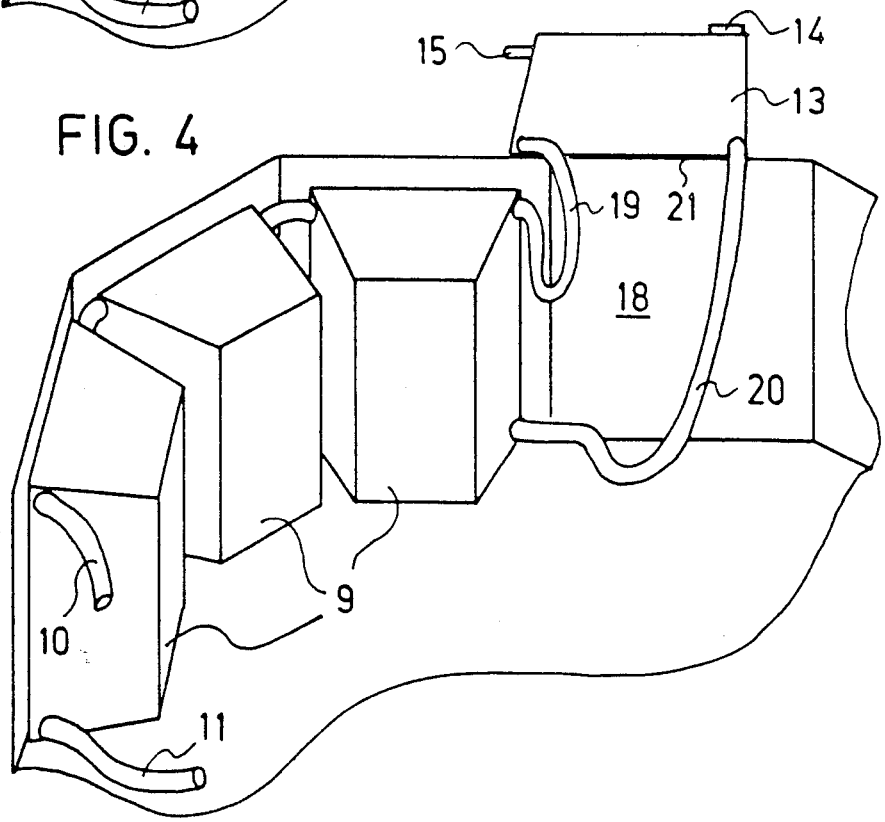
Figure 5:
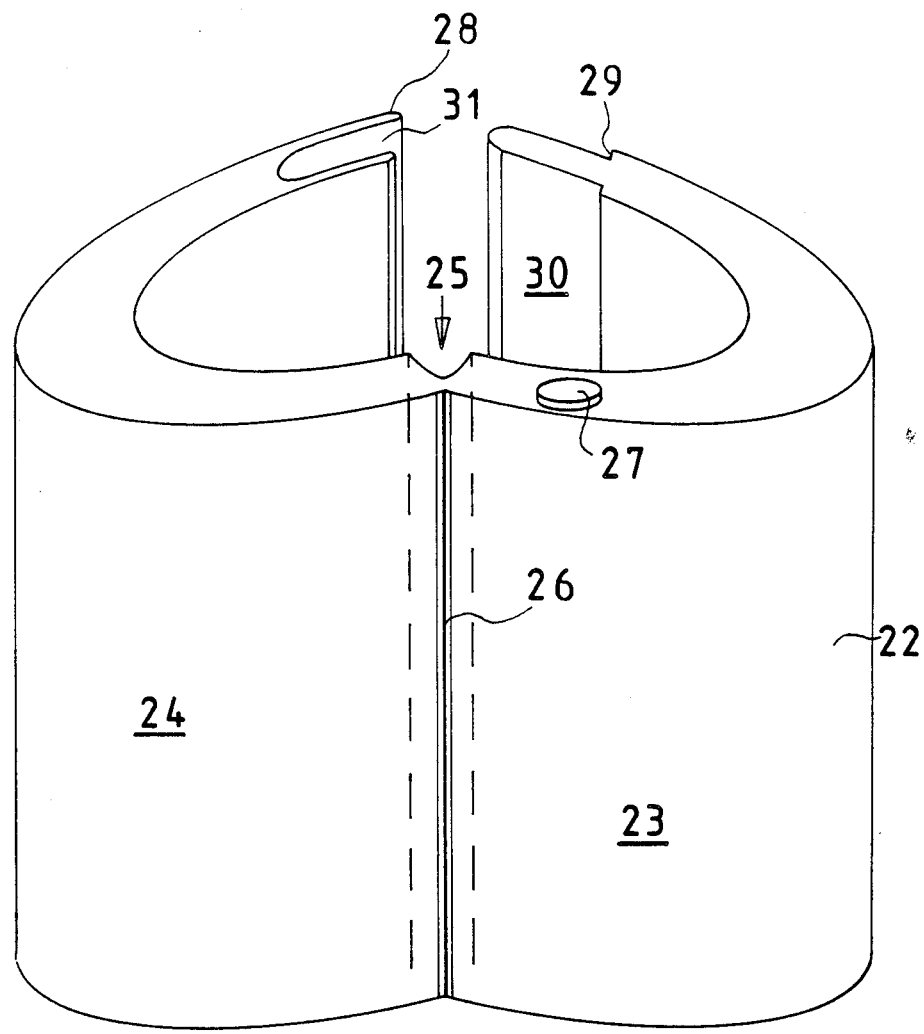
Figure 6:
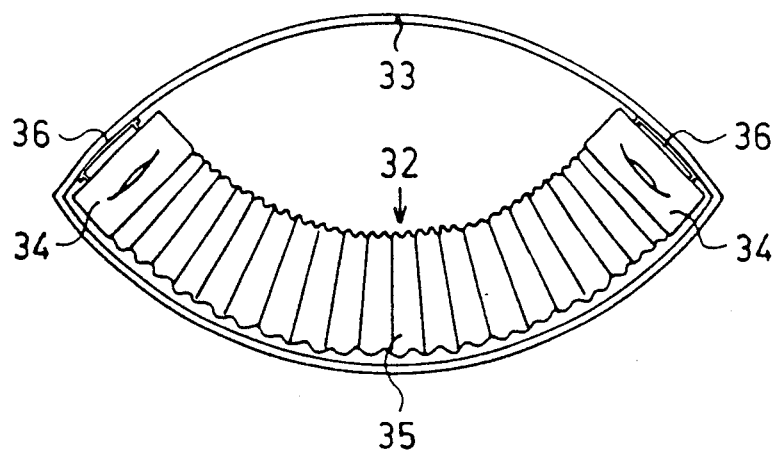
Figure 7:
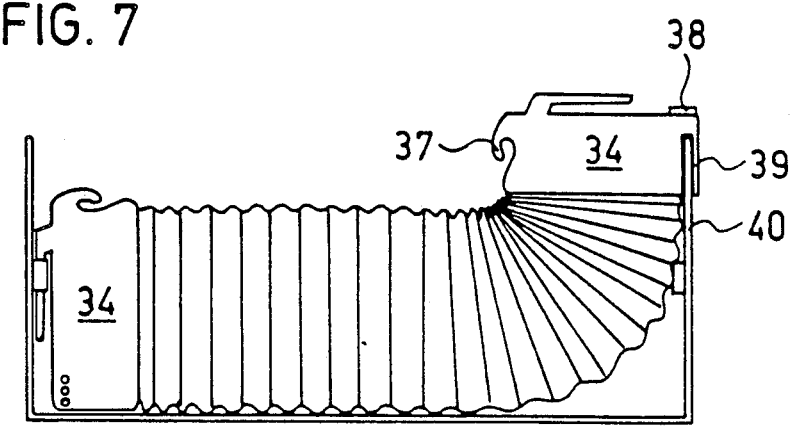

FIG. 3 a water tank, consisting of a tank elements in a plant vessel, that is cut open, FIG. 4 the water tank from FIG. 3 in position for filling, FIG. 5 a flexible ring tank, FIG. 6 a folding tank, sketched in a lenticular plant vessel, FIG. 7 a folding tank in position for filling in perspective view in a plant vessel, that is cut open, FIG. 8 a sub-atmospheric pressure tank with a transparent pipe-water-level indicator in two examples of operation, a and b.

Figure 10A:
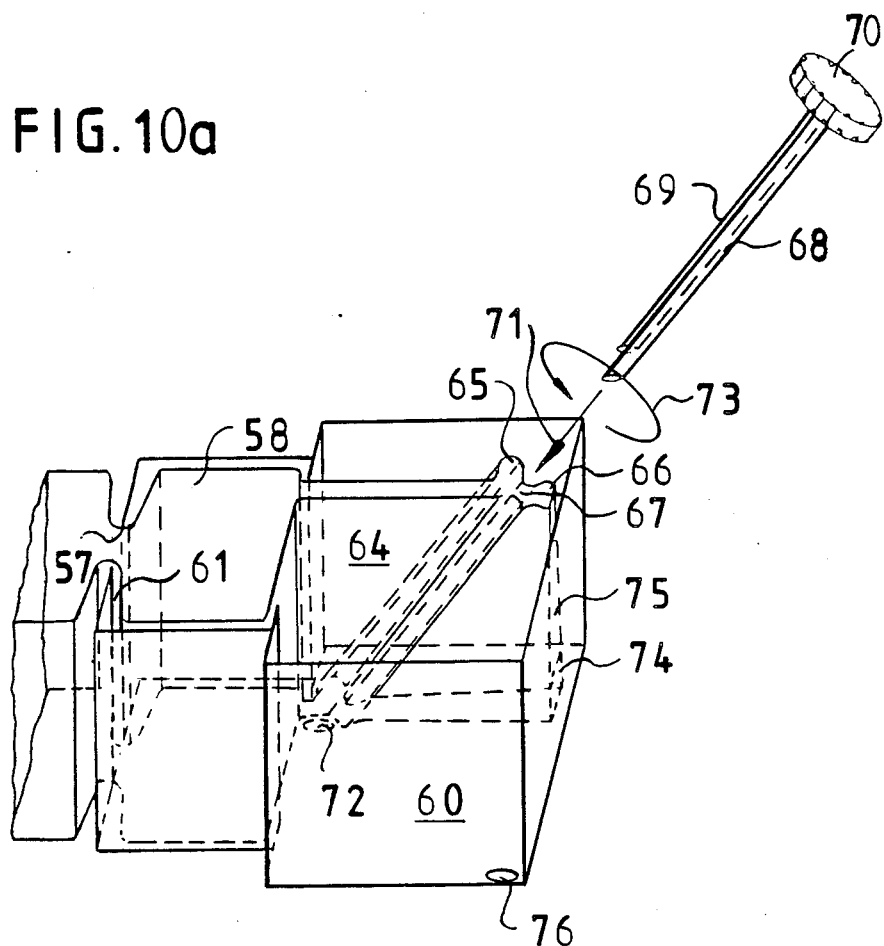
Figure 10B:
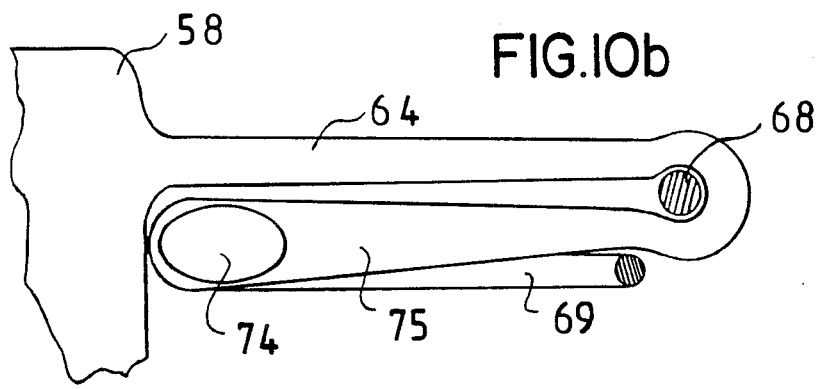
Figure 11:
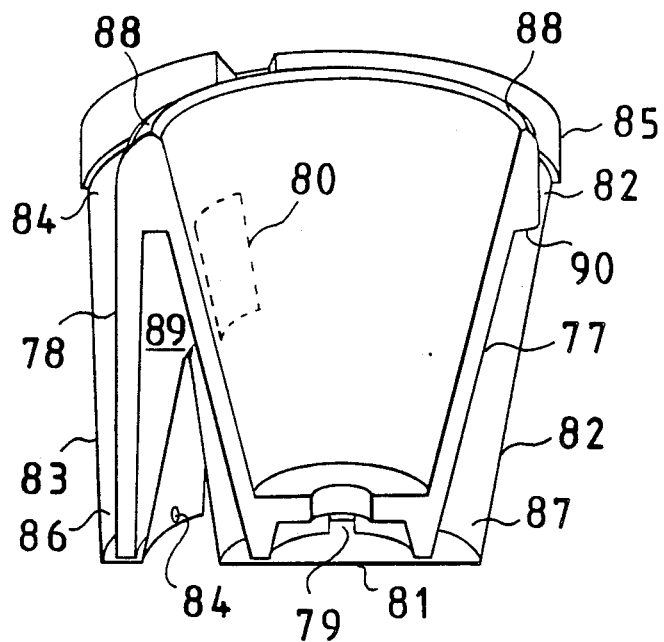
Figure 12:
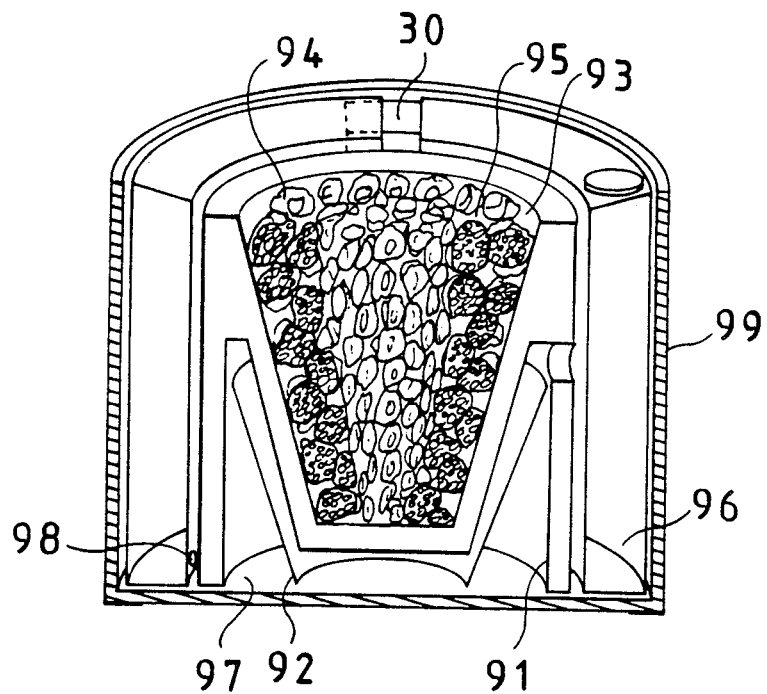
Figure 13A:
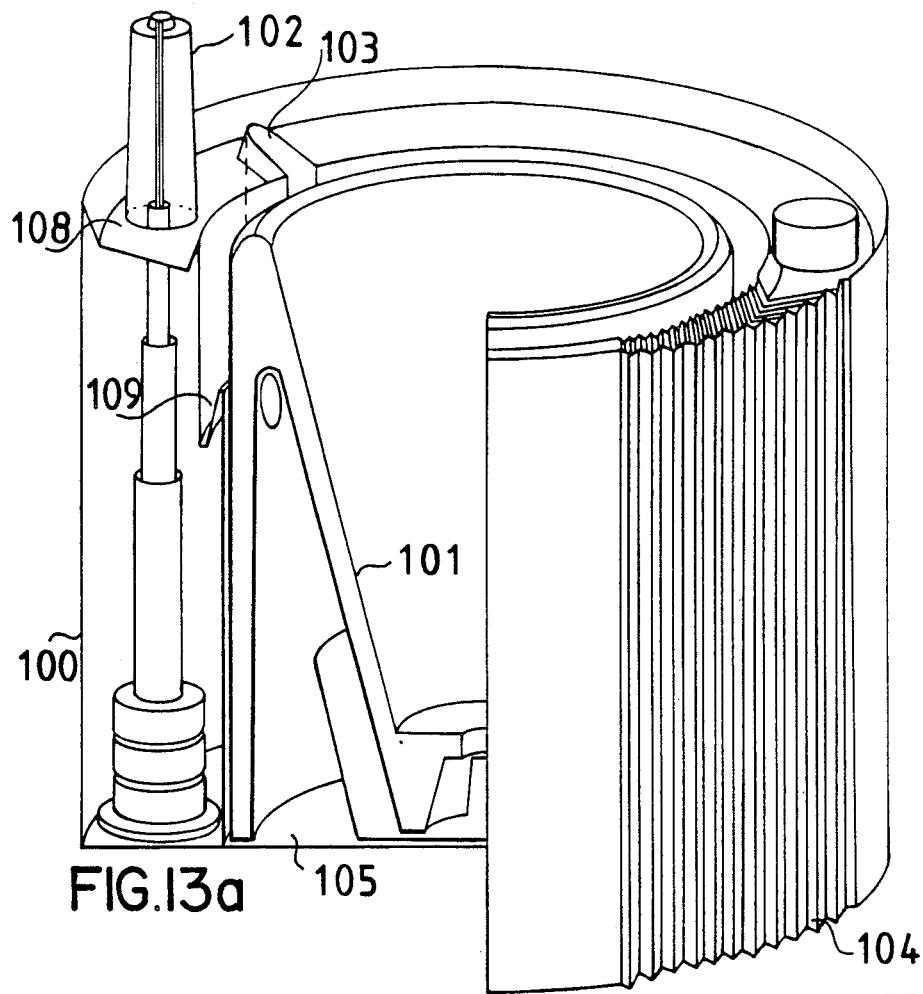
Figure 13B:
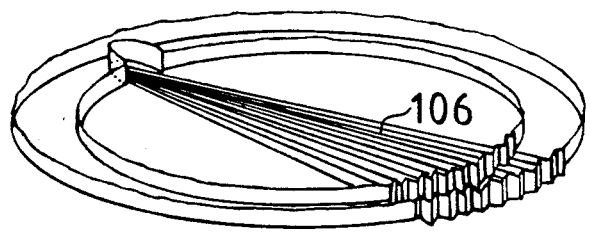
Figure 13C:
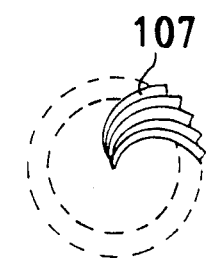
Figure 14:
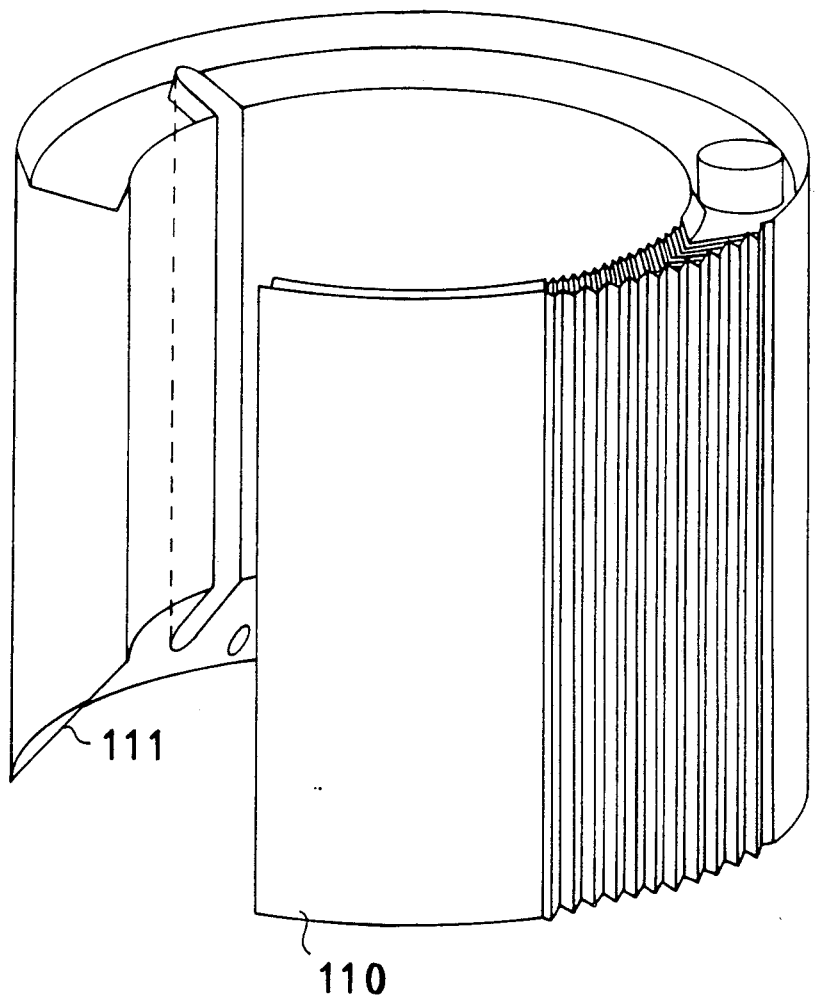
Figure 15:
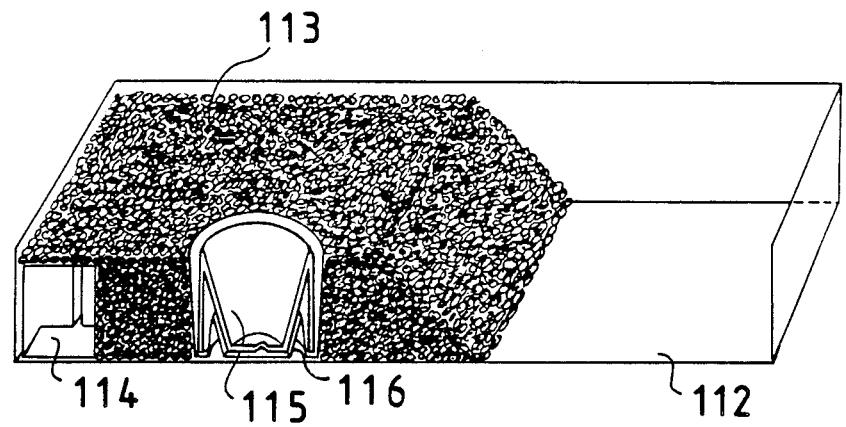

FIG. 9 an articulated folding tank, as a combined example of operation, with detail-diagrams a–g;

FIG. 10 an articulated tank end with flexible, double-walled swing plate for the filling up with water, in the graphic reproductions a and b;

FIg. 11 a plant pot with shaft-peg (left), standing in a double-chambered vessel (transverse sections);

FIG. 12 a bonsai-plant vessel with ring tank and covering pot (semitransverse section);

FIG. 13 a flexible ring tank with bottom, indicator, double-shaft plant pot and ground bowl (presentation with sector), in variants a–c;

FIG. 14 a flexible ring tank (with sector);

FIG. 15 a bisected container with plant vessel, double-chamber vessel and articulated tank; the large container partly filled with clay foam granules;

FIg. 16a and 16b a single tank-element in functional position and in position for filling.

Figure 17:
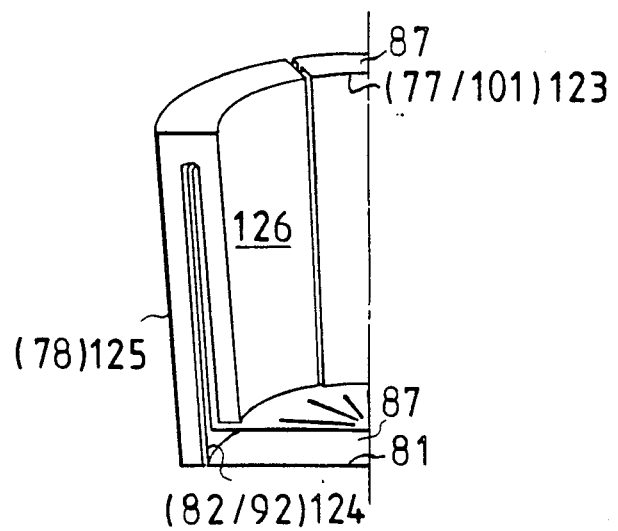

FIG. 17 shows a perspective transverse section of the left rear quarters of two vessels, that are put into each other, ceramic bridge stuck on, as a variant to FIG. 11.

Below the examples of operations presented in the diagrams will be explained in detail and their advantages pointed out.

FIG. 1 shows a so-called articulated tank. This consists of a container with several shape-retaining parts 1, which, regarding the example shown, have a trapeziodal transverse section. These individual container parts 1 are connected with each other one-piece through double-walled parts 2, that each form a film hinge-like area.

Each two of the dimensionably stable parts 1 are relatively movable against each other, in that they traverse against each other around the axes, formed by the said areas. One or more container parts 1 can be equipped with water outlets 3. In order that several different water-levels are adjustable, the water outlets 3 can be made at various heights and closed individually as desired.

A shape retaining container part 4 of the articulated tank can be made larger, in order to include the filler-hole 5 and perhaps a water-level indicator, which will be described later, but is not shown here. The example of operation shown here is distinguished by a smooth surface on the reverse side 6 of the articulated tank, which adapts to the contours of the inner wall of a plant vessel.

The tank adapted to a plant vessel in such a way, is presented in FIG. 2.

Here the plant vessel is a round vessel, and the articulated tank with its smooth side 6 is adapted to the contours of the inner wall 8 of this round vessel. The position of the filler-hole and the water outlets 3 are distinguishable. Through the flexibility of the articulated tank, it can be inserted in plant vessels of the most sundry small and large round and angular forms. If it is applied to the inner rim, It takes up relatively little space, and does not hamper the planting and arranging of a group of plants.

Beyond this, this articulated tank can also be used crossing large plant vessels, whether straight or bent, just as it seems necessary or desirable at any one time.

The articulated tank realised according to the invention has considerable advantages compared to the water tanks in use till now. One and the same articulated tank can be used in many different kinds of plant vessels, and hence a special tank for each vessel is not needed. Besides this universal range of use, it can be put around the root system of embedded plants as desired. Moreover, several articulated tanks, when produced according to the invention, can also be stored space-savingly, because spread out, they can be piled up.

FIg. 3 shows an especially multi-useable realisation of the object of the invention, in that the water tank consists of several tank elements 9, which are shown here in a plant vessel 8 that is cut open. The individual tank elements 9 are connected with two flexible hoses 10, 11. These hoses 10,11 are with advantage untieably connected with the tank elements 9. The upper hose 10 is fastened near to or at the top of the container 16 and enables the exchange of air among the tank elements, that are connected with one another. The lower hose 11 on the other hand, is fastened near or at the container bottom 17, in order to ensure the flow of water into that tank element 13, which is equipped with a water outlet 12. Such a water outlet can also be available in several of the tank elements, and the water outlets 12 can be made in various heights, in order to regulate the desired water-level in the plant vessel 18 by closing the respective water outlet. The filling up with water can be done through special tightly closable filler-holes at the top of any one of the individual tank elements. Another possibility shown here, that is in certain cases more advantageous, is to make the filler-hole 14 near the bottom. Through the flexible connection with the adjoining tank element, it is possible, to lift the tank element 13 with the filler-hole 14 out of the plant vessel with the aid of the handle 15 and turn it, so that the filler-hole 14 that was below, now is on top. In this position, refilling can be done easily. If the above-mentioned tank element 13 also is the only one, that is equipped with a water outlet 12, there is no danger during refilling, that water leaks out into the plant vessel 18 due to the possibility of air entering.

This is illustrated by FIG. 4. It shows the tank element 13 with water filler-hole 14 near the container bottom in position for refilling. It is important, that both of the connecting hoses 19,20 to this tank element 13 with the filler-hole 14 are sufficiently long and flexible enough, so that the tank element 13 can be lifted up high enough. To its advantage and to lift it up, it is fitted with a handle 15 and its reverse side 21 is designed in such a way, that it can be put down on a flat surface, in order that the filling can proceed easily.

The example of operation shown in FIG. 5 shows a flexibile ring tank 22. This type of tank has the advantage that it can be fitted into a whole series of round vessels, which are really very widespread. Regarding this example of realisation, its partial containers or container parts from hollow cylindrical segments with an outer radius, which corresponds to that of the smallest round vessel into which the ring tank is supposed to fit. The ring tank shown 22, consists of two shape-retaining partial containers or container parts 23,24, which are traversably connected with one another at the point 25 over a double-walled, film hinge-like area 26. The filler-hole 27 is here put in one of the partial containers. Examples of operation are possible with the filler-hole at the bottom, as well as such with the filler-hole at the top, only in the latter case, it must be hermetically sealable. Regarding ring tanks with the filler-hole below, it must be possible to take them completely out of the plant vessel for refilling. The water outlet is below and can be put in one or more partial containers and at various heights, in order to make a desired water-level adjustable by the shutting of particular water outlets. For fitting into round plant vessels of various sizes, the hollow cylindrical segments traverse back and forth against each other around the position 25. In order that the ring tank 22 always forms a closed ring, and that no clay granules from without can get into the inner plant pot-space, past the end sides 28,29 of the partial containers 23,24 traversing towards one another, they have an overlapping area, in which the one end side 29 has a hollow and flexible extension 30, which fits into a cavity 31 at the end side 28 of the opposite partial container 24. The overlapping area can also be formed by only one flap-shaped extension of the inner wall of one of the partial containers. Of course a ring tank in accordance with the invention can also consist of three or still more hollow cylindrical segments.

The folding tank in accordance with the invention, of which FIG. 6 shows an example of operation sketched lying in a lenticular plant vessel 33, is especially suited for quadratic, rectangular or plurigonal plant vessels. This folding tank 32 consists essentially of two shape-retaining container parts 34, that are movable towards each other by means of a folding bellows 35. The folding tank 32 can thus be squeezed together and moved apart, similar to the bellows of an accordion. However, the folding bellows 35 cannot only be pulled in one direction, but also permits turning movements and, with a circular transverse section even in every direction. The folding tank 32 shown here has a rectangular transverse section. In order to guarantee its functioning according to the principle of sub-atmospheric pressure, the folding bellows 35 must be stable enough, to ensure, that during progressive draining, which causes the sub-atmospheric pressure inside it, it does not get squeezed together by the atmospheric pressure outside it, because of which so much water could flow out, that in the plant vessel it could exceed the water-level of the water outlet opening. For that reason, means of fastening 36 are necessary, by means of which the dimensionally stable container parts 34 can be untieably fastened to the plant vessel 33. Thus the folding belows 35 cannot contract during emptying. Besides the quality of fitting into the most sundry planting vessels, the folding tank also offers an important advantage regarding the procedure of refilling. Since its shape-retaining container parts 34 are movable, the filler-hole too, can, like the water outlet, be put near the bottom of such a container part 34. Through this, the filler-hole no longer has to be hermetically closable, and the danger of accidental escape of water is dispelled.

As presented in FIG. 7 by outline of the front of plant vessel 40, the container part 34 with the filler-hole 38, is lifted out of the plant vessel 40 for refilling with water, by means of the handle 37, so that the filler-hole 38 is at the top. This position can be maintained through fastening means 39, that make it possible, to fix the said container part 34 to the plant vessel rim 40.

Suitability of form provided, the partial containers or container parts of each water tank in accordance with the invention can be equipped with a removable bottom, which is formed to click into position on the hollow bodies. If the hollow bodies are additionally formed conically toward the top, the tanks without a bottom part can be stacked at once both on top of and into one another.

Figure 8A:
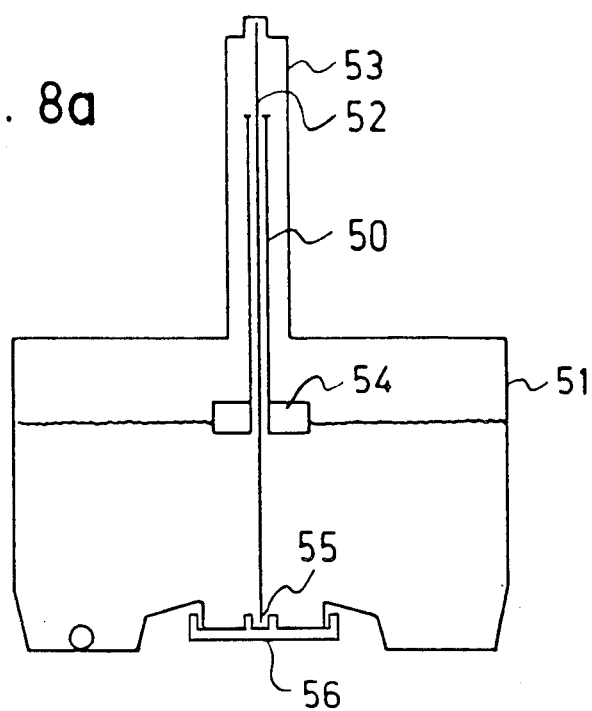
Figure 8B:
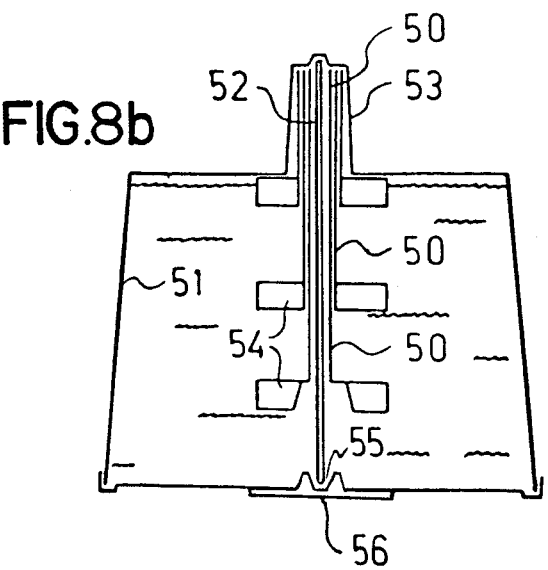

FIGS. 8a and 8b show water-level indicators for the tanks in accordance with the invention. The water-level is read off the indicators 50, which are visible through a transparent pipe 53, that is projecting above the container 51. This transparent pipe 53, that is sealed at the top, contains a guiding-rod 52, along which the indicators 50 are led, each of which on its bottom end is connected with a float 54. The guiding-rod 52 is on its bottom end by a special indentation 55 fastened in the closing lid 56. The closing lid 56 in the container bottom, closes the opening that is made large enough, that the complete water-level indicator can be removed and reinserted through it. In order not to have the transparent pipe stick up too far, the construction with several floating parts and staggered indicator pipes 50 is suggested. They can each be in a different colour. For example the outside pipe green, the next one yellow and the inside pipe red. From the level of the small indicator pipes as well as from the colours, the exact water-level can be read easily, also from the short aesthetic outside pipe 53. The object of the invention is also for example, to place several short and small indicator pipes 53 with small transparent pipes 50 of one colour relatively close to one another, or a flat, short transparent cupola, in which several individual indicators 50 appear, which are each connected with a single float 54. Through little elevations/bars between the movable pipe parts 50 and floats 54, the movement function of the parts 50/54 is ensured. The flat, short transparent cupola ($\triangleq$53) can also be formed as a handle 15/37. The problem that no water should escape from the tankk, when it is being filled, has already been presented at the beginning.

The articulated tank in FIG. 9, with movable areas 57 in the middle between the individual partial containers 58, is complemented to advantage by folding bellows 59. The articulated tank part is stable against strain, as far as clay granules are concerned, and the folding bellows in front 59 can be filled up well (FIG. 9g). This specific front part requires a protective container 60, especially with side opening 61 and cover part 62.

Analoglous to the markings A—A and B—B, the FIGS. 9c-f show suggestions for some transverse sections, respectively of the widest and most narrow dimensions of the articulated tank part. In order to prevent a bending of the narrow area 57, which would block off a connection, for example when used in large, rectangular containers, on the one hand, the flexible area 57 in comparison to the example of operation FIG. 1 was shifted to the middle area (FIG. 9b, Pos. 57). On the other hand, the cross-sectional form of the articulated tank is designed with pipe-like upper and lower canal 63.

A compound of activated carbon, calcium and ion exchanger as granules, hollow body or solid body 123 provides for a good water- and nutriment quality. The occasional refilling procedure regulates by a certian pressure and friction-process the disengagement of tar parts from the activated carbon against oxygen consuming putrefaction bacteria. Calcium sulphate and activated carbon as well as ion exchanger wrap each other. Thus they act combined, also through a certain mechanical strain, during a longer period of time advantageous to the quality of water, whereat the calcium sulphate, as is well known, as fertilizer improves the water for the plants.

The articulated tank part 57/58 together with the folding tank in front 59 is advantageously made out of one piece in one operation (below technique).

A further variant in respect to the problem area of refilling technique is suggested in FIG. 10. FIG. 10a shows a double-chamber vessel 60 in front. In this, the left chamber contains the first partial container 58 of an articulated tank. A flexible, double-walled swing plate 64 is attached to this. The plate 64 shows two additional enlargement bar cambers 65 and 66, running diagonally, between which a reduction 67 of the plate 64 is distinct. Here a parallel staff turn-key 68/69 with border knob 70 is fitted on. The somewhat longer key staff 68 in front fits into a conducting hole at the bottom 72. The key in now swung to the right 73 about 180° (around the staff 68) so that the opening 74 is at the top—detail figure 'b'. Water is filled in through this filler+function-device-opening 74 without any water escaping during the filling procedure. If one lets go of the border knob after the filling, the nearer, lower plate half swings back by itself into the position of its other function. Clay foam granules, which during the filling possibly have moved in, are pushed aside by the plate, so that the opening 74 again stands in its original position.

The swing plate 64 is formed advantageously thus, that the outer right hand side—front side 75— is shaped wider toward the opening 74, in order that the opening 74 has the necessary size for filling. The movable swing plate in front can also be operated without the key part and double up. The required space is offered by the respective larger chamber of the front vessel 60. Through the vessel gap 61 or through the opening 76, the water can reach the mixed culture plant vessels of the combined device, that stand in the large container. The swing plate 75 can also be lifted up by means of a front vessel lid, that is to be opened/swung open. Therefore the lid has a hinge on its left side, and near the bottom (close to the opening 74) it is flexibly connected with the swing plate 75. For this, the triangular swing plate part 64 is kept rigid. With this variant there is no key 68–70 needed.

A porous and capillary plant pot 77 with rim shaft peg 78 is seen in the FIG. 11. It stands in the double-chamber intermediate pot 81. The plant pot 77 stands in the larger container side 82, that is watertight. The rim shaft peg 78 stands in the smaller container part 83, that exhibits a closable opening 84 at the bottom. In the upper area, the double-chamber vessel 81 forms a joint inner space 84 and upper rim 85. The outer chamber 86 partly fills itself with water through the device tank, so that the water can reach the actual plant pot 77 through the capillary effect of the plant pot-shaft peg 78, and from there all around to the root system of the earth plants and can be absorbed by the plant. This watering is advantageous, because the earth is also not even occasionally slushy full of water, and does therefore not quickly solidify. Also the root-ventilation is maintained, because the capillary-intensity of the clay can be ideally preprogrammed and graduated through the admixture of floury wood material. In addition the dry container side 87 provides for the carbon dioxide exchange of the plant roots. That is why, regarding the plant pot, bottom ring shaft openings 79 are intended.

If one closes the opening 84 and if one fills the side pocket 86 with water, then a plant is provided for, for the transport and during the time till sale, for a meduim period of time. The intermediate pot 81 also has the function of an interchange cuff and protects the plant pot 77/78 against falling in/moving up clay foam granules (see e.g. FIG. 15).

The plant pot 77 can also be designed with openings in the upper area 80 (indicated), so that the earth culture plant develops as hetero culture plant (hetero =halfhydro), since there it grows morphologically other roots (water roots) into the reservoir (86). Therefore clay foam granules are filled in there 86. Also for this purpose a plant without plant pot (77) can be put in, then all spaces 86+87 are filled with moist clay foam granules.

The upper rim area 88 of the capillary pot 77 is advantageously solidified, to prevent evaporation (glazing, impregnation). Also the whole plant pot 77/78 can advnatageously be glazed, to prevent evaporation and calcination.

The shaft peg 78 is fitted/manufactured on the outside of the plant pot-stacking rim 90, and to save space, is formed cylindrical and perpendicular downwards. Its shaft circumference area comprises about 58°–60° or 70°–72° respectively 88°–90°. That corresponds to about $\frac{1}{4}$, 1/5 or 1/6 of the plant pot-rim circumference. Depending on the height of the stacking rim and this in connection with the whole height of the pot, the pots 77/78 can, with a trick, be stacked well into each other. When stacking, the pots 77 are slightly turned, so that, when putting the ring shafts into each other, the shaft pegs 78 are put alongside of each other. This gives stability to the stacked rolls of pots 77/78; it also protects the shaft pegs against breaking, and space is saved, which lowers expenses.

Regarding FIG. 12, The perpendicular shaft of the plant pot 91 is formed all around (endless). The intermediate pot 92 is formed small in size. In the inner area of the pot-shaft 93, there a double layer of clay granules 94 is frit together to each other and to (at) the inner pot-shaft during manufacture, in the manner as one who fits a handle onto a jug. This example of operation simulates a cleft in a rock for a plant, so that the plant becomes a bonsai. The intervals 95 between the granules 94 offer the plant the possibility to clutch the seeming rock with the roots, and give the plant air. The granules emit capillary moisture. THe ring tank as shown in FIG. 5 provides the plants over a longer period of time. The intermediate-pot vessel 92 protects the plant against stationary moisture. The bottom water reservoir 97 is between the bowl 92 and the tank 96. Pos. 98 shows the tank outlet-opening. Pos. 99 shows the covering pot as a small vessel.

FIG. 13 essentially shows the invention-device with the elements tank 100, plant pot 101 and water-guage 102.

The ring tank is formed on one side with a flexible indentation 103, and on the opposite side a folding part area 104 is intended. The tank is manufactured with a bottom 105 that exhibits radiating bottom folds 106, which make the tank flexible. the tank 100 can also be formed in folding construction all around. In this case the folds are on the bottom and otherwise chiefly in the horizontal area spirally formed, as shown in 107. It is of advantage, to put onto the vessel bottom a separate plastic disc, to protect the folds of the inside botton area ($\hat{=}$106) from damages through the plant pots 77/101, 82/83. The tank is to be manufactured in the combined blow-pressure die-casting technique. Its advantage 100 is the possible use also as covering pot. The upper rim grove 108 offers the advantage, that here very decoratively medium clay foam granules can be put. The groove 109 is intended for a cotton-wool filling, that by means of capillary conductors is connected with the bottom reservoir and continually moistens a normal clay pot by rim contact. From the groove a flower in the earth-plant pot can also be cared for through a textile capillary conductor.

FIG. 14 likewise shows an endless ring tank, but without bottom. Interesting here is additional space for the roots, because toward the lower end of the ring tank the inner wall recedes slantingly, thus increasing the width in the clear of the tanks lower ends inner space 111.

FIG. 15 shows the large container 112 with a partial filling of granules 113 and articulated tank 114 as well as the double shaft-plant pot 115 with double chamber intermediate pot 116.

FIG. 16 shows a partial container 51 with double chamber-swing hose 117 and indentations 118 and 119 in the canal part. The stopper connected with the hose 120 shows a closing and filliing variant 121 for the sub-atmospheric pressure tank 121.

FIG. 17 shows a perspective transverse section of the left rear quarters of two vessels, that are put into each other, wilth a ceramic bridge stuck on, as a variant to FIG. 11.

I claim:

1. In a tank-plant vessel-combination having a water-level indicator and a tank device for a long-term water-supply for various types of plant cultures whereby the tank device operats under sub-atmospheric pressure, a porous plant vessel element, and a water-level float indicator and a supplement comprises a calcium sulphate-activated carbon compound, the improvement comprising:

a plurality of communicating partial tanks that are movable with respect to each other and are connected with each other to form a deformable container, said porous plant vessel element having a supplementary shaft extending outward, surface-frit coarse clay granules contained within said porous plant vessel and a double-compartment vessel which parts are fitted adjacent each other within the deformable container, said water-level float indicator positioned within at lwast one of the partial tanks having a transparent hollow body closed at a top and projecting upward, with at least one floating part which is in a clear space each guided by means of at least one of a guiding rod above and a transparent hollow body perforated pipe shaft below.

2. Device according to claim 1, wherein the partial tanks (9) communicate with each other through at least two flexible hoses (10, 11), whereby at least a first hose (11) is fastened near a bottom (17) of the partial tanks (9) and a second hose (10) is fastened near a top (16) of the partial tanks (9).

3. Device according to claim 1, wherein through reduction in diameter of the container at least at one point (25), a double-walled film hinge-like area (26) is formed, whereby each said point (25) divides the container into two shape-retaining partial containers (23, 24).

4. Device according to claim 3, wherein the partial containers (23, 24) form a ring-shaped tank, variable in diameter (22) and the partial containers (23, 24) form hollow cylindrical segments.

5. Device according to claim 4, wherein the two shape-retaining partial containers each have a free end, one partial container (24) has at least one overlapping part (28) as a hollow body element, and the other partial container (23), on its end side (29) has a flexible, hollow extension (30) in the form of a diameter reduced peg (30).

6. Device according to claim 1, wherein the partial tanks are relatively moveable with respect to each other (34), connected with each other through a folding bellows (35), and that the dimensionally stable container parts (34) have means for securing the partial tanks to the plant vessel (33).

7. Device according to claim 1, wherein a filler hole (38) is located near a bottom of the container parts (34).

8. Device according to claim 1, wherein the container parts toward a top have a conical shape and a removable bottom that is made as to snap into place onto the hollow bodies.

9. Device according to claim 1, wherein in a shape-retaining container part (51) said water-level float indicator has a transparent pipe (53) that rises above and is sealed at a top, encircles a guiding rod (52) which projects upward from and is secured to a bottom (55), and that at least one float (54) has an indicator pipe (50)

which is guided on the guiding rod (52), between each indicator pipe (50) and each float (54) bars are attached; and said bottom (55) has, opposite the transparent pipe (53), a closable opening (56).

10. Device according to claim 9, wherein an articulated tank with a flolding tank (59) having a swing plate (64) in front.

11. Device according to claim 1, wherein at least one shaft (91) is located outside the plant vessel (77, 101, 115) where a capillary connects with a stacking rim (90) and the vessel shaft tapers in an area of 1/6 to a full stacking rim-circumference.

12. Device according to claim 11, wherein the plant vessel has a double shaft (77, 78) and a glaze, and in an area of an inner shaft (93) has a layer of granules (94) with hollow spaces (95).

13. Device according to claim 1, wherein the plant vessel has a double-shafted outer container (83, 86) with an opening capable of being opened and closed located in an area a bottom.

14. Device according to claim 13, wherein the plant vessel that holds a plant pot (82, 92) is manufactured watertight and has only one shaft-wall.

15. Device according to claim 14 wherein a ring tank (100) has a reduction in diameter (25, 103), an upper tank groove (108), a capillary material filled-ring furrow (109), a bottom (105) and folds (104, 106, 107) located in an area of the tank.

16. Device according to claim 14 wherein there is a U-shaped, ceramic, capillary bridge (125/126), that is on a top of lower shafts of an inner plant vessel (123) and a watertight outer vessel (82/92;124) and the vessel (123,124) is made of plastic material.

17. Device according to claim 1, wherein small, granule-like hollow bodies consisting of calcium sulphate, activated carbon and fine ion exchanger, plastic globules and solid bodies are deposited in an area of a tank outlet respectively between a tank bottom of the plant vessel (77, 78,101) and a tank receiver-vessel bottom of a vessel bottom respectively in battery vessels.

* * * * *